United States Patent
Aguilar, Jr. et al.

(10) Patent No.: US 8,468,532 B2
(45) Date of Patent: Jun. 18, 2013

(54) ADJUSTING CPU TIME ALLOCATED TO NEXT THREAD BASED ON GATHERED DATA IN HETEROGENEOUS PROCESSOR SYSTEM HAVING PLURALITY OF DIFFERENT INSTRUCTION SET ARCHITECTURES

(75) Inventors: Maximino Aguilar, Jr., Georgetown, TX (US); David John Erb, Austin, TX (US); Sidney James Manning, Austin, TX (US); James Michael Stafford, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 1684 days.

(21) Appl. No.: 11/425,448

(22) Filed: Jun. 21, 2006

(65) Prior Publication Data
US 2007/0300231 A1 Dec. 27, 2007

(51) Int. Cl.
*G06F 9/46* (2006.01)

(52) U.S. Cl.
USPC ............................................. 718/103

(58) Field of Classification Search
USPC .......................................... 718/104, 107, 103
See application file for complete search history.

(56) References Cited

U.S. PATENT DOCUMENTS

| | | | | |
|---|---|---|---|---|
| 5,881,223 | A * | 3/1999 | Agrawal et al. | 714/47.1 |
| 6,272,517 | B1 * | 8/2001 | Yue et al. | 718/102 |
| 7,446,773 | B1 * | 11/2008 | Alben et al. | 345/502 |
| 7,458,077 | B2 * | 11/2008 | Duke | 718/102 |
| 7,898,545 | B1 * | 3/2011 | Alben et al. | 345/519 |
| 2003/0115118 | A1 * | 6/2003 | Reinemann | 705/30 |
| 2004/0193861 | A1 * | 9/2004 | Michaelis | 713/1 |
| 2005/0013705 | A1 * | 1/2005 | Farkas et al. | 417/393 |
| 2005/0081203 | A1 * | 4/2005 | Aguilar et al. | 718/100 |

* cited by examiner

*Primary Examiner* — Jennifer To
*Assistant Examiner* — Brian Chew
(74) *Attorney, Agent, or Firm* — VanLeeuwen & VanLeeuwen; Matthew B. Talpis (57) ABSTRACT

A method that optimizes system performance using performance monitors is presented. The method gathers thread performance data using performance monitors for threads running on either a first ISA processor or a second ISA processor. Multiple first processors and multiple second processors may be included in a single computer system. The first processors and second processors can each access data stored in a common shared memory. The gathered thread performance data is analyzed to determine whether the corresponding thread needs additional CPU time in order to optimize system performance. If additional CPU time is needed, the amount of CPU time that the thread receives is altered (increased) so that the thread receives the additional time when it is scheduled by the scheduler. In one embodiment, the increased CPU time is accomplished by altering a priority value that corresponds to the thread.

8 Claims, 7 Drawing Sheets

ADJUSTING CPU TIME ALLOCATED TO NEXT THREAD BASED ON GATHERED DATA IN HETEROGENEOUS PROCESSOR SYSTEM HAVING PLURALITY OF DIFFERENT INSTRUCTION SET ARCHITECTURES

BACKGROUND OF THE INVENTION

1. Technical Field

The present invention relates in general to a system and method for optimizing system performance using a performance monitor. More particularly, the present invention relates to a system and method that monitors threads in a plurality of dissimilar processors and optimizes CPU time among the processors based on analyzing data gathered for the various threads.

2. Description of the Related Art

Computing systems that use a combination of heterogeneous processors are becoming increasingly popular. In these environments, one or more general purpose processors work in conjunction with one or more special purpose processors. Being different processor types, the general purpose processors use a different instruction set architecture (ISA) than the ISA used by the special purpose processors. Having different processing characteristics and ISAs lends each processor type to efficiently performing different types of tasks.

Because of the different characteristics of the processors, this heterogeneous environment is attractive to a variety of applications, such as multimedia, gaming, and numeric intensive applications. In this environment, a program can have multiple threads. Some of these threads can execute on the general purpose processors and other threads can execute on the special purpose processors. A challenge, however, is that resource availability is not often known until an application is running. A challenge, therefore, is predetermining the amount of CPU time that should be allocated to the various threads. This challenge is exacerbated in a heterogeneous processing environment where one type of CPU (based on a first ISA) may be constrained, while another type of CPU (based on a second ISA) may not be constrained.

What is needed, therefore, is a system and method that monitors thread performance in a heterogeneous processing environment. What is further needed is a system and method that dynamically alters the amount of CPU time that threads received based upon an analysis of the thread performance data.

SUMMARY

It has been discovered that the aforementioned challenges are resolved using a system and method that gathers thread performance data using a performance monitor. The threads may be running on either a first processor that is based on a first instruction set architecture (ISA), or a second processor that is based on a second ISA. Multiple first processors and multiple second processors may be included in a single computer system. The first processors and second processors can each access data stored in a common shared memory. The gathered thread performance data is analyzed to determine whether the corresponding thread needs additional CPU time in order to optimize system performance. If additional CPU time is needed, the amount of CPU time that the thread receives is altered (increased) so that the thread receives the additional time when it is scheduled by the scheduler. In one embodiment, the increased CPU time is accomplished by altering a priority value that corresponds to the thread.

In another embodiment, a user can configure the system by choosing performance selections that are stored and used by the performance monitor when gathering data. The user can also select which processors monitor thread performance. In this manner, if one processor is dedicated to a particular task and does not swap out for different threads, then there is little need to monitoring the dedicated thread(s) running on the processor.

In another embodiment, a common scheduler is used to schedule threads to both the first processors and the second processors. In this embodiment, the thread performance data is stored in the shared memory. The scheduler determines whether a particular processor is running below a predefined CPU utilization. If the processor is running below the predefined utilization, then the CPU time that the threads receive for the processor are adjusted as described above. However, if the processor is running at an acceptable utilization level, then the CPU time that the threads receive is not adjusted.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
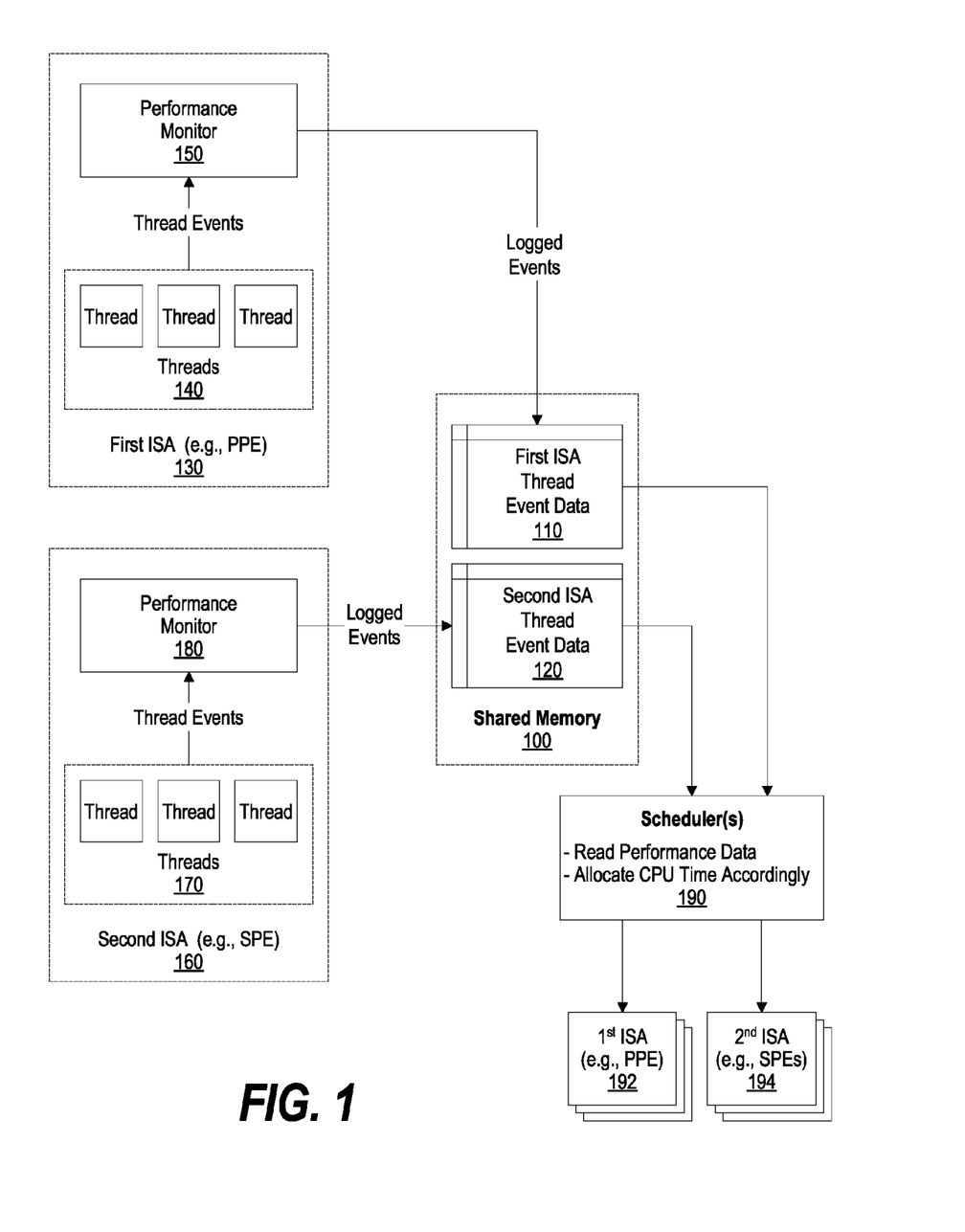
FIG. 1 is a diagram showing performance monitors in a heterogeneous processing environment gathering thread performance data that is used by schedulers to allocate CPU time.

FIG. 1 is a diagram showing performance monitors in a heterogeneous processing environment gathering thread performance data that is used by schedulers to allocate CPU time. In the example shown, two heterogeneous processor types are being used with each processor type based upon a different instruction set architecture (ISA). Processes that are being executed by processors based upon a first ISA are enclosed in box 130, while processes that are being executed by processors based upon a second ISA are enclosed in box 160. Processes being run by both ISAs include performance monitors and various threads. Performance monitor 150 monitors thread events occurring in the first ISA, while performance monitor 180 monitors thread events occurring in the second ISA. Threads 140 represents various threads that are being executed by processors based upon the first ISA, while threads 170 represents various threads that are being executed by processors based upon the second ISA. Processors of both ISAs are able to access data stored in shared memory 100. As explained in further detail in FIG. 7, in one embodiment, processors based on the first ISA are Primary Processing Elements (PPEs), while processors based on the second ISA are Synergistic Processing Elements (SPEs). In this embodiment, a broadband engine bus is used to facilitate access of the shared memory by the various processors.

In the embodiment shown in FIG. 1, thread event data is stored in shared memory 100. Thread event data for threads running on a first ISA processor (e.g., on one of the PPEs) are stored in memory area 110, while thread event data for threads running on a second ISA processor (e.g., on one of the SPEs) are stored in memory area 120. Scheduler 190 reads the thread event data and allocates CPU time accordingly. Scheduled threads are dispatched to either one of the processors based on the first ISA (processors 192) or to one of the processors based on the second ISA (processors 194). In one embodiment, a common scheduler schedules threads for both types of processors (processors 192 and 194). This embodiment facilitates scheduling of "assist" threads running on one of the SPEs at the same time the main thread is scheduled to run on one of the PPEs. Of course, those of skill in the art will appreciate that separate schedulers could be used so that one scheduler schedules threads to run on one type of processor, such as the PPEs, while another scheduler schedules threads to run on another type of processor, such as the SPEs.

Figure 2:
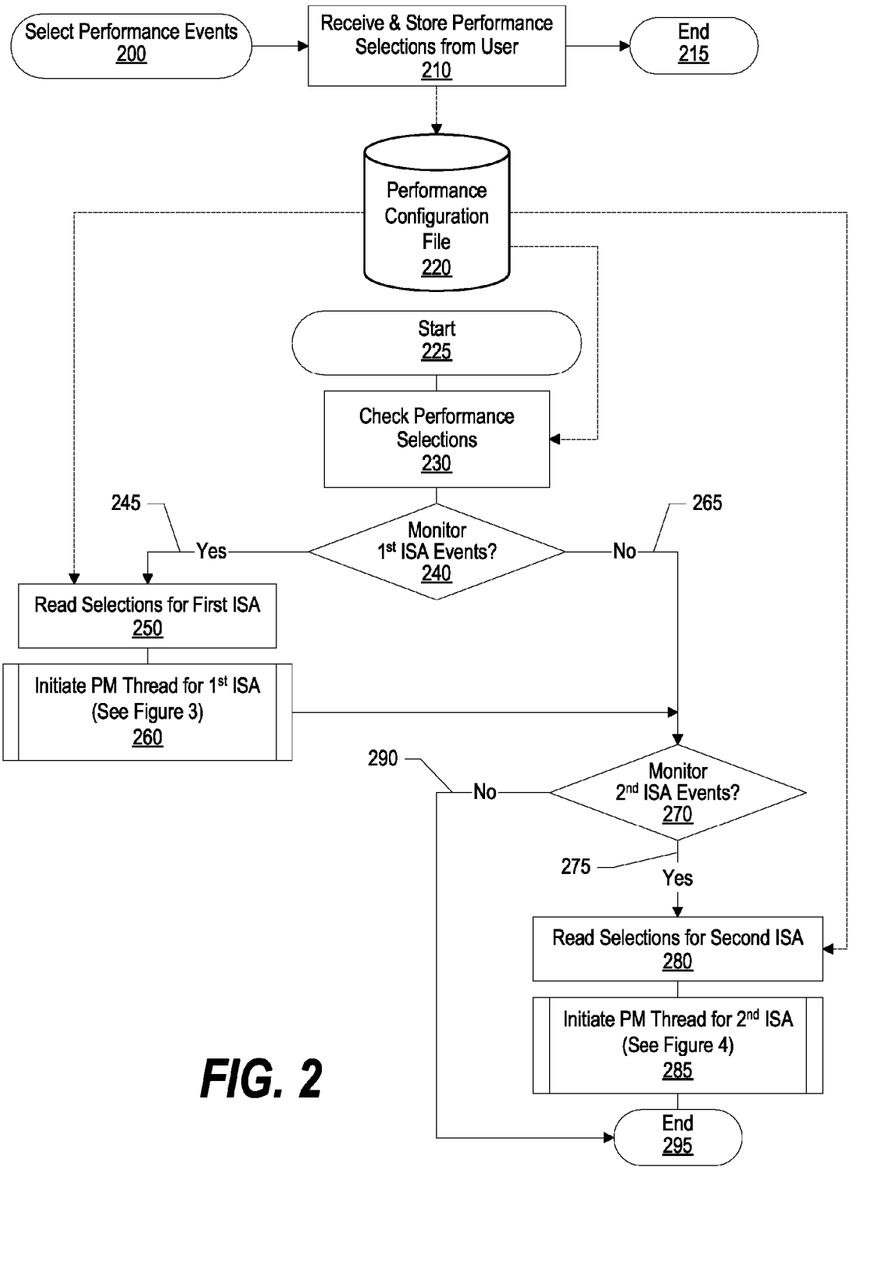
FIG. 2 is a high-level flowchart showing the steps taken to use performance monitors to gather thread data in a heterogeneous processing environment.

FIG. 2 is a high-level flowchart showing the steps taken to use performance monitors to gather thread data in a heterogeneous processing environment. First, the small flowchart across the top commencing at 200 shows a user choosing performance selections which, at step 210, are received and stored in performance configuration file 220. In addition, the user can select which processors should monitor performance of threads running on the processor. For example, a particular process or thread can be dedicated to a given processor, such as one of the SPEs. As a dedicated process, the process is not swapped in and out, therefore monitoring its performance to increase its CPU time would not be needed since the process is already dedicated to a processor. Moreover, the user can decide to only monitor threads running on a particular processor type, such as monitor threads running on the PPE and not those running on the SPEs, or vise versa. Finally, the user can also set thresholds on the various processors so that the CPU time alterations described herein are only performed when a processor's utilization is below the user-defined threshold. In this manner, the user can select the thresholds and events that trigger additional CPU time for threads as well as the processors where thread events are gathered by the performance monitors. Additionally, default configuration settings can be established setting default events to monitor as well as default processors and threshold values. When default settings are used, the mechanism shown in the small flowchart can then be used to alter these default settings. The small flowchart thereafter ends at 215.

Performance monitor processing is shown in the larger flowchart and commences at 225 whereupon, at step 230, the performance selections stored in performance configuration file 220 are checked. A determination is made as to whether thread events running in on processors based on the first ISA (e.g., the PPE) are being monitored (decision 240). If thread events running in on processors based on the first ISA are being monitored, decision 240 branches to "yes" branch 245 whereupon, at step 250, the selections from the performance configuration file are read indicating the type of events to gather for the threads and, at predefined process 260, the performance monitor that gathers thread event data for thread running on first ISA processors is initiated (see FIG. 3 and corresponding text for processing details). On the other hand, if thread events running in on processors based on the first ISA are not being monitored, decision 240 branches to "no" branch 265 bypassing steps 250 and 260.

A determination is made as to whether thread events running in on processors based on the second ISA (e.g., the SPEs) are being monitored (decision 270). If thread events running in on processors based on the second ISA are being monitored, decision 270 branches to "yes" branch 275 whereupon, at step 280, the selections from the performance configuration file are read indicating the type of events to gather for the threads and, at predefined process 285, the performance monitor that gathers thread event data for thread running on second ISA processors is initiated (see FIG. 4 and corresponding text for processing details). On the other hand, if thread events running in on processors based on the second ISA are not being monitored, decision 270 branches to "no" branch 290 bypassing steps 280 and 285. Processing thereafter ends at 295.

Figure 3:
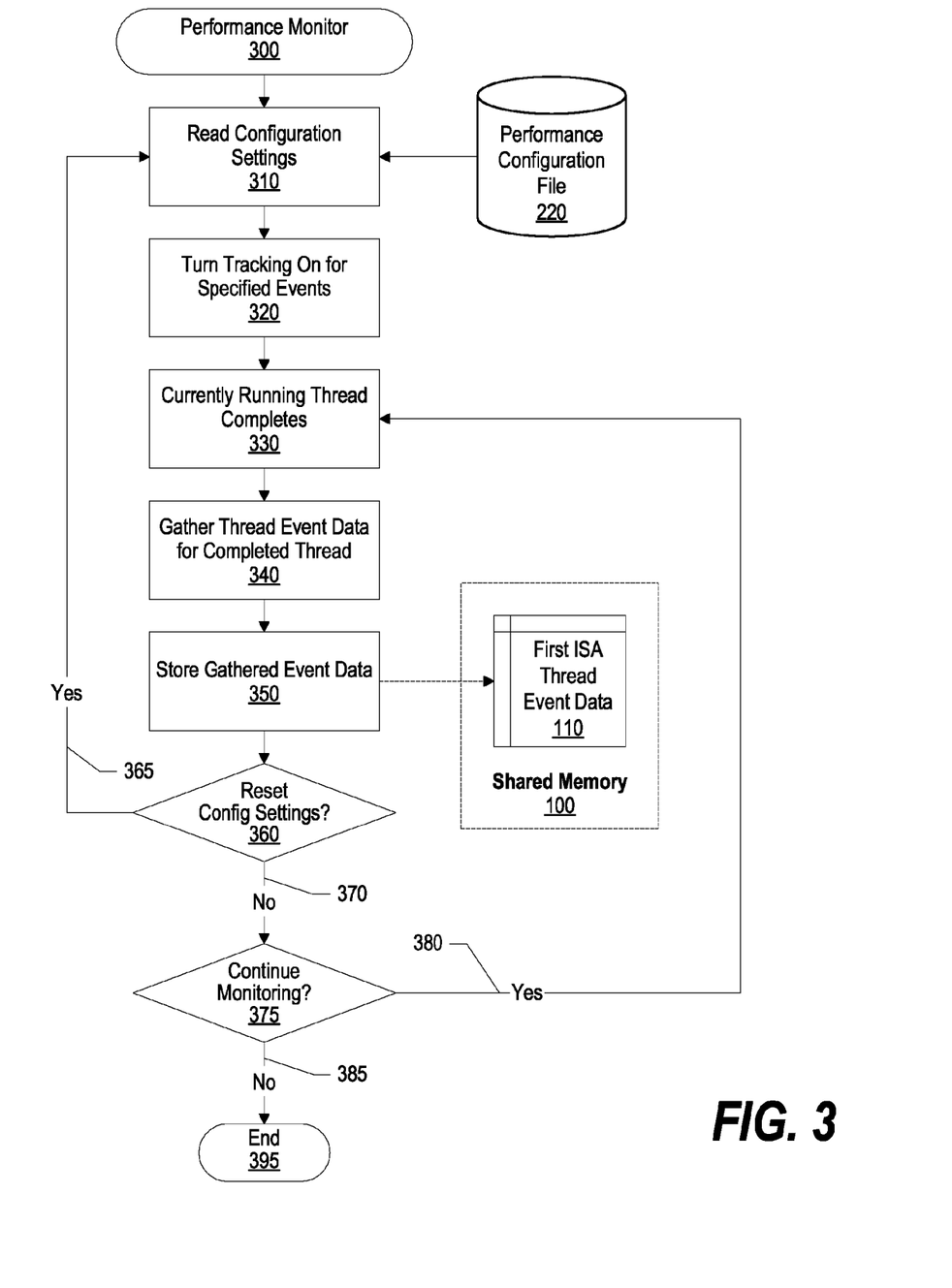
FIG. 3 is a flowchart showing steps taken by a performance monitor to gather thread event data for a first CPU that is based on a first instruction set architecture (ISA)
Figure 4:
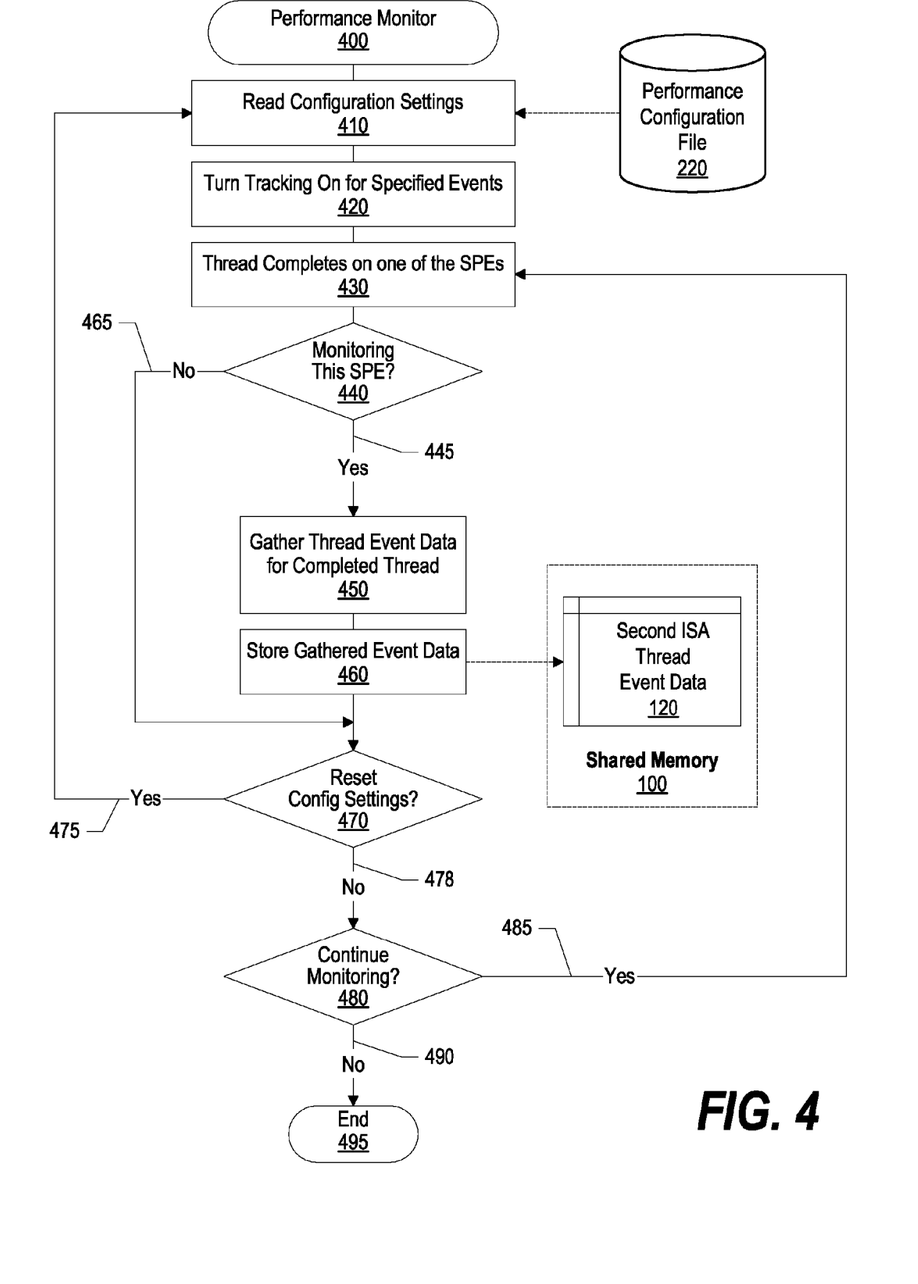
FIG. 4 is a flowchart showing steps taken by a performance monitor to gather thread event data for a one or more second CPUs that are each based on a second ISA.

FIG. 3 is a flowchart showing steps taken by a performance monitor to gather thread event data for a first CPU that is based on a first instruction set architecture (ISA). The performance monitor described in FIG. 3 is used when only one processor of a particular type is being used. In one embodiment, the processor element includes a single primary processing element (PPE) processor and multiple synergistic processing elements (SPEs). This embodiment is described in more detail in FIG. 7. In an environment with a single PPE, the steps shown in FIG. 3 can be used to monitor the threads running on the processor. FIG. 4, on the other hand, is used to monitor performance of threads when multiple processors of a particular type are present in the processor element.

Returning to FIG. 3, processing commences at 300 whereupon, at step 310, settings for the processor type that is being monitored are retrieved from performance configuration file 220. At step 320, event tracking is turned on for the events specified in the performance configuration file. At step 330, a thread that is currently running on the processor completes or is timed out. At step 340, the performance monitor gathers event data that was accumulated during execution of the thread that just completed. At step 350, this event data is stored in memory area 110 within shared memory 100. A determination is made as to whether to reset configuration settings (decision 360). For example, if the user edited the performance configuration file (see FIG. 2, steps 200-215), then the system would reset the configuration settings. To reset configuration settings, decision 360 branches to "yes" branch 365 which loops back to clear the configuration settings and retrieve the configuration settings stored in the performance configuration file. On the other hand, if configuration settings are not being reset, then decision 360 branches to "no" branch 370 whereupon a determination is made as to whether to continue monitoring threads running on the processor (decision 375). For example, the user may turn performance monitoring off for this processor or the system may be shut down. If monitoring continues, decision 375 branches to "yes" branch 380 which loops back to gather thread event data for the next thread that completes. This looping continues until monitoring is turned off or a system shutdown occurs, at which time decision 375 branches to "no" branch 385 and performance monitoring ends at 395.

FIG. 4 is a flowchart showing steps taken by a performance monitor to gather thread event data for a one or more second CPUs that are each based on a second ISA. The performance monitor described in FIG. 4 is used when only multiple processors of a particular type are being used. In one embodiment, the processor element includes multiple synergistic processing elements (SPEs). This embodiment is described in more detail in FIG. 7. In an environment with a multiple SPEs, the steps shown in FIG. 4 can be used to monitor the threads running on the processors.

Processing commences at 400 whereupon, at step 410, settings for the processor type that is being monitored are retrieved from performance configuration file 220. At step 420, event tracking is turned on for the events specified in the performance configuration file. At step 430, a thread that is currently running on one of the processors completes or is timed out. A determination is made as to whether the processor where the thread was running is being monitored (decision 440). For example, the performance configuration file may indicate that one or more processors (e.g., SPEs) are not being monitored. If the performance monitor is monitoring the processor that was running the thread that just completed, decision 440 branches to "yes" branch 445 whereupon, at step 450, the performance monitor gathers event data that was accumulated during execution of the thread that just completed. At step 460, this event data is stored in memory area 120 within shared memory 100. On the other hand, if the performance monitor is not monitoring this SPE, decision 440 branches to "no" branch 465 bypassing steps 450 and 460.

A determination is made as to whether to reset configuration settings (decision 470). For example, if the user edited the performance configuration file (see FIG. 2, steps 200-215), then the system would reset the configuration settings. To reset configuration settings, decision 470 branches to "yes" branch 475 which loops back to clear the configuration settings and retrieve the configuration settings stored in the performance configuration file. On the other hand, if configuration settings are not being reset, then decision 470 branches to "no" branch 478 whereupon a determination is made as to whether to continue monitoring threads running on this type of processor (decision 480). If monitoring continues, decision 480 branches to "yes" branch 485 which loops back to gather thread event data for the next thread that completes on one of the processors (so long as the processor is being monitored). This looping continues until the user turns off performance monitoring or a system shutdown occurs, at which time decision 480 branches to "no" branch 490 and performance monitoring ends at 495.

Figure 5:
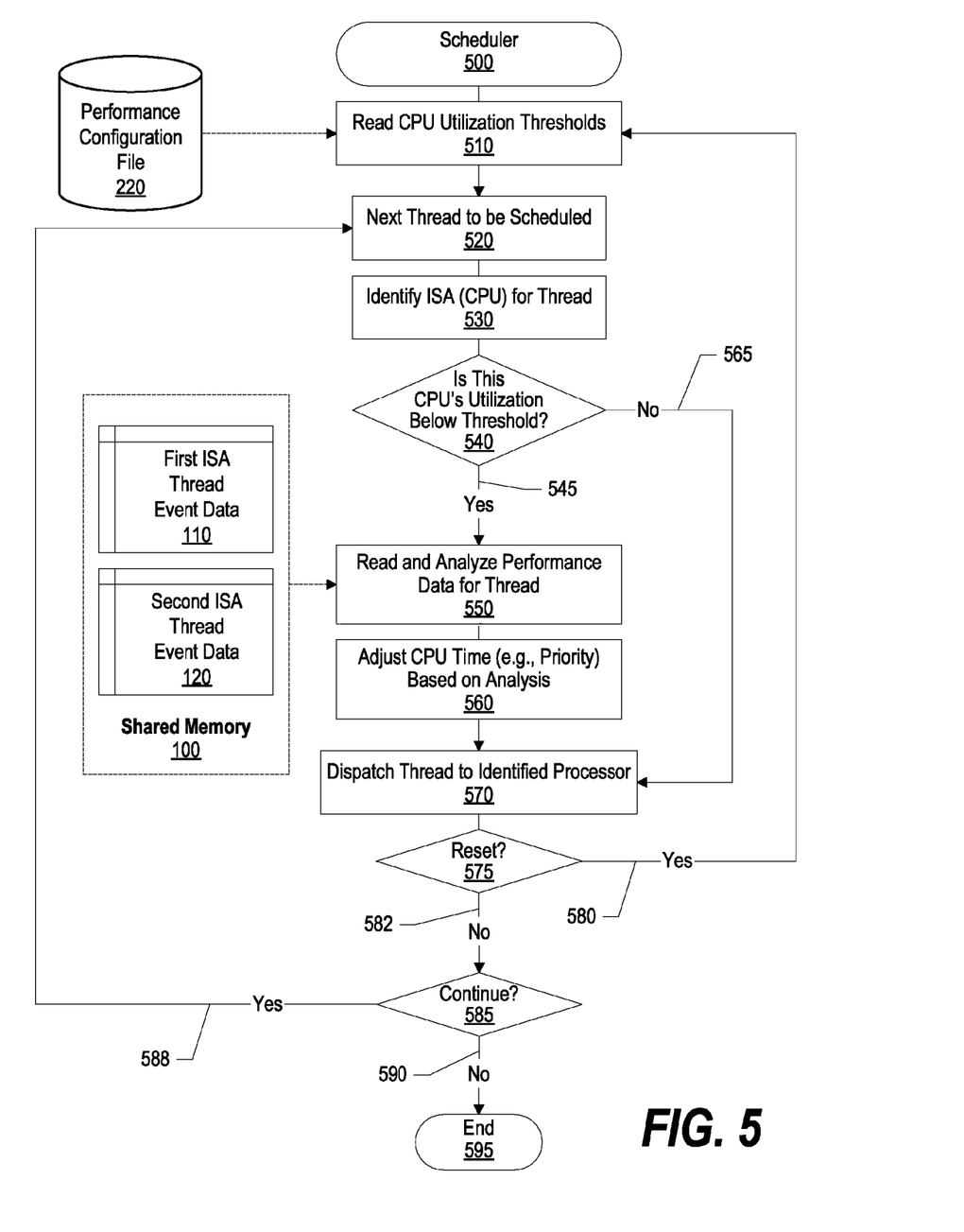
FIG. 5 is a flowchart showing the steps taken by a scheduler to allocate CPU time based on gathered thread event data.

FIG. 5 is a flowchart showing the steps taken by a scheduler to allocate CPU time based on gathered thread event data. In the embodiment shown, a single scheduler is used to schedule threads for both types of processors (those based on the first ISA, e.g., an PPE, and those based on the second ISA, e.g., an SPE). However, the scheduler shown can easily be modified so that more than one scheduler are used to schedule the threads to the various processor types.

Processing commences at 500 whereupon, at step 510, the scheduler retrieves CPU utilization thresholds from performance configuration file 220. At step 520, the scheduler retrieves data regarding the next thread to be dispatched to one of the processors. At step 530, an ISA for the next thread is identified along with a processor that is based upon the identified ISA. For example, if the next thread runs on the first ISA, then a processor that is based on the first ISA (e.g., the PPE) is identified. On the other hand, if the thread runs on the second ISA, then one of the processors that is based on the second ISA (e.g., one of the SPEs) is identified.

In the embodiment shown, a determination is made as to whether the identified processor's utilization is below the threshold that was set for the processor (decision 540). The thresholds for the various processors was previously read in step 510. If the identified processor's utilization is below the threshold that was set for the processor, decision 540 branches to "yes" branch 545 whereupon, at step 550, the performance data gathered by the performance monitor for the thread is retrieved (from either memory 110 or memory 120 depending on whether it is a thread running on the first or second ISA) and the retrieved data is analyzed. At step 560, the amount of CPU time that the thread will receive is adjusted, if necessary, based on the analysis. Returning to decision 540, if the identified processor's utilization is not below the threshold that was set for the processor, decision 540 branches to "no" branch 565 bypassing steps 550 and 560. In an alternate embodiment, decision 540 is not performed so that steps 550 and 560 are performed regardless of the processor's utilization.

At step 570, the thread is dispatched to the identified processor once the thread currently running on the identified processor ends or is swapped out. A determination is made as to whether to reset the threshold values (decision 575). The thresholds would be reset if the user edits performance configuration file 220 using steps 200 through 215 shown in FIG. 2. If the threshold values are reset, decision 575 branches to "yes" branch 580 which loops back to read in the new utilization thresholds at step 510. On the other hand, if the utilization threshold values are not reset, decision 575 branches to "no" branch 582.

Another determination is made as to whether to continue processing (decision 585). Processing continues while the system is running in order to schedule threads for execution (i.e., processing continues until the system is shutdown). If processing continues, decision 585 branches to "yes" branch 588 which loops back to schedule and dispatch the next thread for execution. This looping continues until the system is shutdown, at which point decision 585 branches to "no" branch 590 and processing ends at 595.

Figure 6:
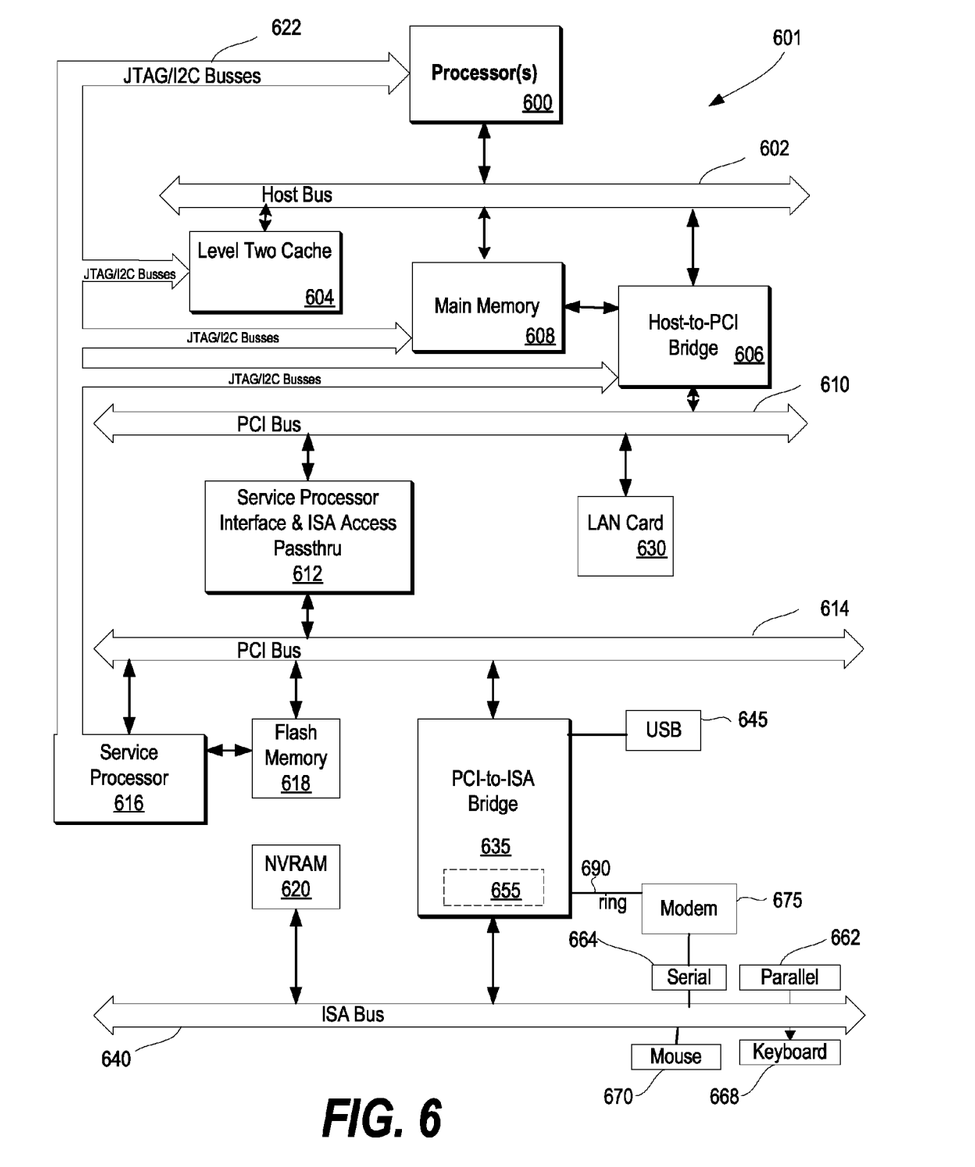
FIG. 6 is a block diagram of a traditional information handling system in which the present invention can be implemented.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs are capable of performing the processes described herein.

Figure 7:
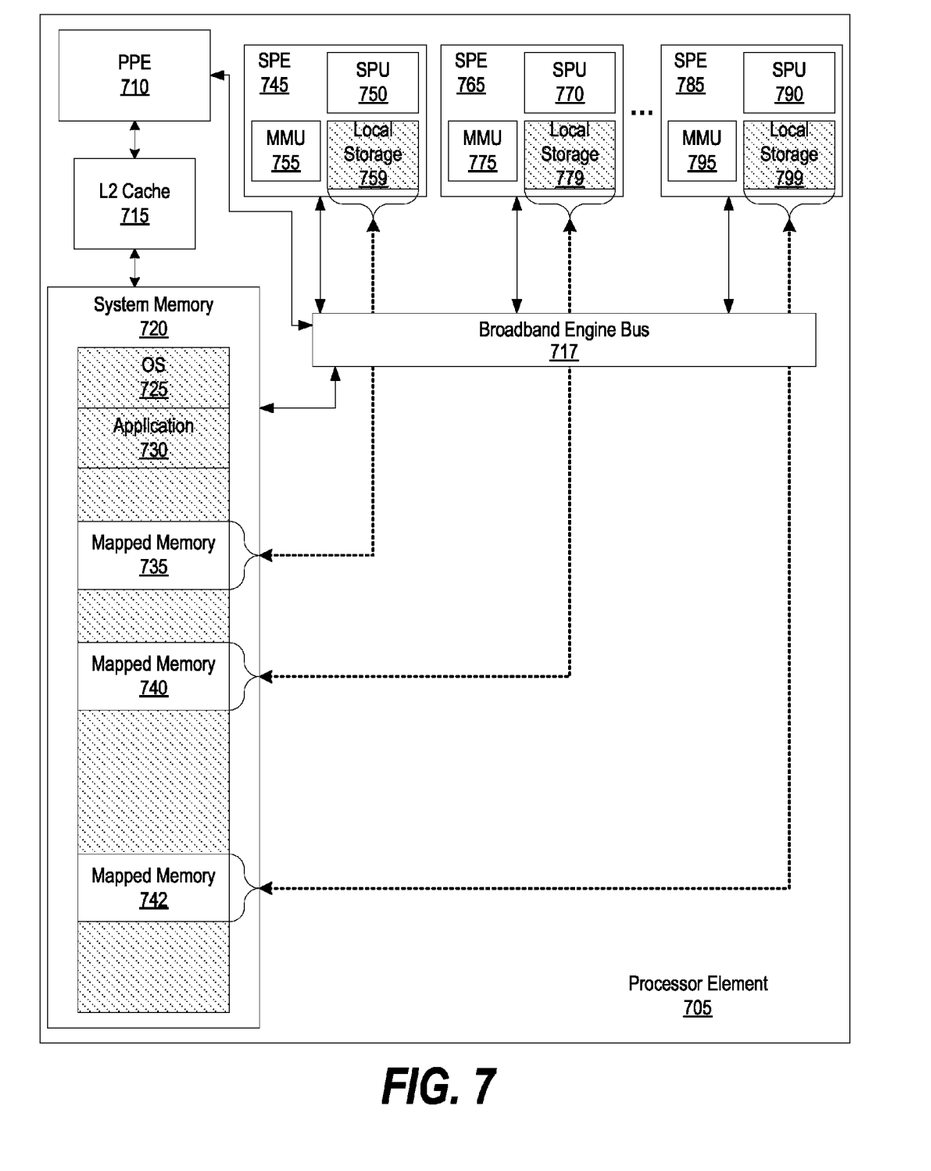
FIG. 7 is a block diagram of a broadband engine that includes a plurality of heterogeneous processors in which the present invention can be implemented.

FIG. 7 is a block diagram illustrating a processing element having a main processor and a plurality of secondary processors sharing a system memory. FIG. 7 depicts a heterogeneous processing environment that can be used to implement the present invention. Primary Processor Element (PPE) 705 includes processing unit (PU) 710, which, in one embodiment, acts as the main processor and runs an operating system. Processing unit 710 may be, for example, a Power PC core executing a Linux operating system. PPE 705 also includes a plurality of synergistic processing elements (SPEs) such as SPEs 745, 765, and 785. The SPEs include synergistic processing units (SPUs) that act as secondary processing units to PU 710, a memory storage unit, and local storage. For example, SPE 745 includes SPU 760, MMU 755, and local storage 759; SPE 765 includes SPU 770, MMU 775, and local storage 779; and SPE 785 includes SPU 790, MMU 795, and local storage 799.

Each SPE may be configured to perform a different task, and accordingly, in one embodiment, each SPE may be accessed using different instruction sets. If PPE 705 is being used in a wireless communications system, for example, each SPE may be responsible for separate processing tasks, such as modulation, chip rate processing, encoding, network interfacing, etc. In another embodiment, the SPEs may have identical instruction sets and may be used in parallel with each other to perform operations benefiting from parallel processing.

PPE 705 may also include level 2 cache, such as L2 cache 715, for the use of PU 710. In addition, PPE 705 includes system memory 720, which is shared between PU 710 and the SPUs. System memory 720 may store, for example, an image of the running operating system (which may include the kernel), device drivers, I/O configuration, etc., executing applications, as well as other data. System memory 720 includes the local storage units of one or more of the SPEs, which are mapped to a region of system memory 720. For example, local storage 759 may be mapped to mapped region 735, local storage 779 may be mapped to mapped region 740, and local storage 799 may be mapped to mapped region 742. PU 710 and the SPEs communicate with each other and system memory 720 through bus 717 that is configured to pass data between these devices.

The MMUs are responsible for transferring data between an SPU's local store and the system memory. In one embodiment, an MMU includes a direct memory access (DMA) controller configured to perform this function. PU 710 may program the MMUs to control which memory regions are available to each of the MMUs. By changing the mapping available to each of the MMUs, the PU may control which SPU has access to which region of system memory 720. In this manner, the PU may, for example, designate regions of the system memory as private for the exclusive use of a particular SPU. In one embodiment, the SPUs' local stores may be accessed by PU 710 as well as by the other SPUs using the memory map. In one embodiment, PU 710 manages the memory map for the common system memory 720 for all the SPUs. The memory map table may include PU 710's L2 Cache 715, system memory 720, as well as the SPUs' shared local stores.

In one embodiment, the SPUs process data under the control of PU 710. The SPUs may be, for example, digital signal processing cores, microprocessor cores, micro controller cores, etc., or a combination of the above cores. Each one of the local stores is a storage area associated with a particular SPU. In one embodiment, each SPU can configure its local store as a private storage area, a shared storage area, or an SPU may configure its local store as a partly private and partly shared storage.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 710 and by the other SPUs. An SPU may reserve part of its local store in order for the SPU to have fast, guaranteed memory access when performing tasks that require such fast access. The SPU may also reserve some of its local store as private when processing sensitive data, as is the case, for example, when the SPU is performing encryption/decryption.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method in an information handling system comprising a plurality of heterogeneous processors, wherein the plurality of heterogeneous processors includes one or more processors of a first processor type, wherein the first processor type is based on a first instruction set architecture (ISA), and one or more processors of a second processor type, wherein the second processor type is based on a second ISA that is different from the first ISA, the method comprising:
   receiving a performance selection from a user, wherein the performance selection indicates the first processor type as a processor type to monitor;
   selecting one or more first processors based upon the received performance selection, wherein the first processors are of the first processor type;
   gathering thread performance data corresponding to a first plurality of threads running on the one or more selected first processors;
   storing the gathered thread performance data corresponding to the first plurality of threads in a storage area;
   identifying, by a scheduler, a next thread to be scheduled, wherein the next thread is selected from the first plurality of threads;
   identifying an ISA corresponding to the next thread, wherein the identified ISA is the first ISA;
   identifying, based on the identified ISA, a central processing unit (CPU) to execute the next thread, wherein the identified CPU is of the first processor type, and wherein the identified CPU is associated with a utilization threshold;
   determining whether a current utilization threshold for the identified CPU is below the associated utilization threshold for the identified CPU;
   in response to determining that the current utilization threshold is below the associated utilization threshold for the identified CPU, analyzing thread performance data gathered for the next thread, wherein the analyzing includes reading the thread performance data for the next thread from the stored thread performance data for the first plurality of threads; and
   based on the analyzing, adjusting an amount of CPU time allocated to the next thread, the adjusting including modifying a priority value corresponding to the next thread.

2. The method of claim 1 wherein the performance selection further indicates the second processor type as an additional processor type to monitor, the method further comprising:
   selecting one or more second processors based upon the received performance selection, wherein the second processors are of the second processor type;
   gathering thread performance data corresponding to a second plurality of threads running on the one or more selected second processors;
   storing the gathered thread performance data corresponding to the second plurality of threads in the storage area;
   identifying, by the scheduler, a selected second thread to be scheduled, wherein the selected second thread is selected from the second plurality of threads;
   identifying an ISA corresponding to the second selected thread, wherein the identified ISA is the second ISA;
   identifying, based on the identified ISA corresponding to the second selected thread, a second CPU to execute the second selected thread, wherein the identified second CPU is of the second processor type, and wherein the identified second CPU is associated with a second utilization threshold;
   determining whether a current utilization threshold for the identified second CPU is below the associated second utilization threshold for the identified second CPU;
   in response to determining that the current utilization threshold for the identified second CPU is below the associated second utilization threshold for the identified second CPU, analyzing thread performance data gathered for the second selected thread, wherein the analyzing includes reading the thread performance data for the second selected thread from the stored thread performance data for the second plurality of threads; and
   based on the analyzing, adjusting an amount of CPU time allocated to the second selected thread, the adjusting including modifying a priority value corresponding to the second selected thread.

3. The method of claim 2 further comprising: storing the gathered thread performance data in a shared memory, the shared memory accessible from the one or more processors of the first processor type and the one or more processors of the second processor type.

4. An information handling system comprising:
   a plurality of heterogeneous processors, wherein the plurality of heterogeneous processors includes one or more first processors of a first processor type, wherein the first processor type is based on a first instruction set architecture (ISA), and one or more second processors of a second processor type, wherein the second processor type is based on a second instruction set architecture (ISA), wherein the first ISA and the second ISA are different from each other;
   a local memory corresponding to each of the plurality of heterogeneous processors;
   a shared memory accessible by the heterogeneous processors; and a set of instructions stored in one of the local memories, wherein one or more of the heterogeneous processors executes the set of instructions in order to perform actions of:
receiving a performance selection from a user, wherein the performance selection indicates the first processor type as a processor type to monitor;
selecting one or more of the first processors based upon the received performance selection;
gathering thread performance data corresponding to a first plurality of threads running on the one or more selected first processors;
storing the gathered thread performance data corresponding to the first plurality of threads in the shared memory;
identifying, by a scheduler, a next thread to be scheduled, wherein the next thread is selected from the first plurality of threads;
identifying an ISA corresponding to the next thread, wherein the identified ISA is the first ISA;
identifying, based on the identified ISA, a central processing unit (CPU) to execute the next thread, wherein the identified CPU is of the first processor type, and wherein the identified CPU is associated with a utilization threshold;
determining whether a current utilization threshold for the identified CPU is below the associated utilization threshold for the identified CPU;
in response to determining that the current utilization threshold is below the associated utilization threshold for the identified CPU, analyzing thread performance data gathered for the next thread, wherein the analyzing includes reading the thread performance data for the next thread from the stored thread performance data for the first plurality of threads; and
based on the analyzing, adjusting an amount of CPU time allocated to the next thread, the adjusting including modifying a priority value corresponding to the next thread.

5. The information handling system of claim 4 wherein the performance selection further indicates the second processor type as an additional processor type to monitor, and further comprising instructions that perform the actions of:
selecting one or more of the second processors based upon the received performance selection;
gathering thread performance data corresponding to a second plurality of threads running on the one or more selected second processors;
storing the gathered thread performance data corresponding to the second plurality of threads in the storage area;
in response to the gathering and storing, identifying, by the scheduler, a selected second thread to be scheduled, wherein the selected second thread is selected from the second plurality of threads;
identifying an ISA corresponding to the second selected thread, wherein the identified ISA is the second ISA;
identifying, based on the identified ISA corresponding to the second selected thread, a second CPU to execute the second selected thread, wherein the identified second CPU is of the second processor type, and wherein the identified second CPU is associated with a second utilization threshold;
determining whether a current utilization threshold for the identified second CPU is below the associated second utilization threshold for the identified second CPU;
in response to determining that the current utilization threshold for the identified second CPU is below the associated second utilization threshold for the identified second CPU, analyzing thread performance data gathered for the second selected thread, wherein the analyzing includes reading the thread performance data for the second selected thread from the stored thread performance data for the second plurality of threads; and
based on the analyzing, adjusting an amount of CPU time allocated to the second selected thread, the adjusting including modifying a priority value corresponding to the second selected thread.

6. A computer program product stored in a computer memory, comprising functional descriptive material that, when executed by a data processing system comprising a plurality of heterogeneous processors, wherein the plurality of heterogeneous processors includes one or more processors of a first processor type, wherein the first processor type is based on a first instruction set architecture (ISA), and one or more processors of a second processor type, wherein the second processor type is based on a second ISA that is different from the first ISA, causes the data processing system to perform actions that include:
receiving a performance selection from a user, wherein the performance selection indicates the first processor type as a processor type to monitor;
selecting one or more first processors based upon the received performance selection, wherein the selected first processors are of the first processor type;
gathering thread performance data corresponding to a first plurality of threads running on the one or more selected first processors;
storing the gathered thread performance data corresponding to the first plurality of threads in a storage area;
identifying, by a scheduler, a next thread to be scheduled, wherein the next thread is selected from the first plurality of threads;
identifying an ISA corresponding to the next thread, wherein the identified ISA is the first ISA;
identifying, based on the identified ISA, a central processing unit (CPU) to execute the next thread, wherein the identified CPU is of the first processor type, and wherein the identified CPU is associated with a utilization threshold;
determining whether a current utilization threshold for the identified CPU is below the associated utilization threshold for the identified CPU;
in response to determining that the current utilization threshold is below the associated utilization threshold for the identified CPU, analyzing thread performance data gathered for the next thread, wherein the analyzing includes reading the thread performance data for the next thread from the stored performance data for the first plurality of threads; and
based on the analyzing, adjusting an amount of CPU time allocated to the next thread, the adjusting including modifying a priority value corresponding to the next thread.

7. The computer program product of claim 6 wherein the performance selection further indicates the second processor type as an additional processor type to monitor, the computer program product further comprising functional descriptive material that, when executed by the data processing system, causes the data processing system to perform actions that include:
selecting one or more second processors based upon the received performance selection, wherein the second processors are of the second processor type;

gathering thread performance data corresponding to a second plurality of threads running on the one or more selected second processors; storing the gathered thread performance data corresponding to the second plurality of threads in the storage area;

in response to the gathering and storing, identifying, by the scheduler, a selected second thread to be scheduled, wherein the selected second thread is selected from the second plurality of threads;

identifying an ISA corresponding to the second selected thread, wherein the identified ISA is the second ISA;

identifying, based on the identified ISA corresponding to the second selected thread, a second CPU to execute the second selected thread, wherein the identified second CPU is of the second processor type, and wherein the identified second CPU is associated with a second utilization threshold;

determining whether a current utilization threshold for the identified second CPU is below the associated second utilization threshold for the identified second CPU;

in response to determining that the current utilization threshold for the identified second CPU is below the associated second utilization threshold for the identified second CPU, analyzing thread performance data gathered for the second selected thread, wherein the analyzing includes reading the thread performance data for the second selected thread from the stored thread performance data for the second plurality of threads; and based on the analyzing, adjusting an amount of CPU time allocated to the second selected thread, the adjusting including modifying a priority value corresponding to the second selected thread.

8. The computer program product of claim 7, the computer program product further comprising functional descriptive material that, when executed by the data processing system, causes the data processing system to perform actions that include:

storing the gathered thread performance data in a shared memory, the shared memory accessible from the one or more processors of the first processor type and the one or more processors of the second processor type.

* * * * *